Figure 1:
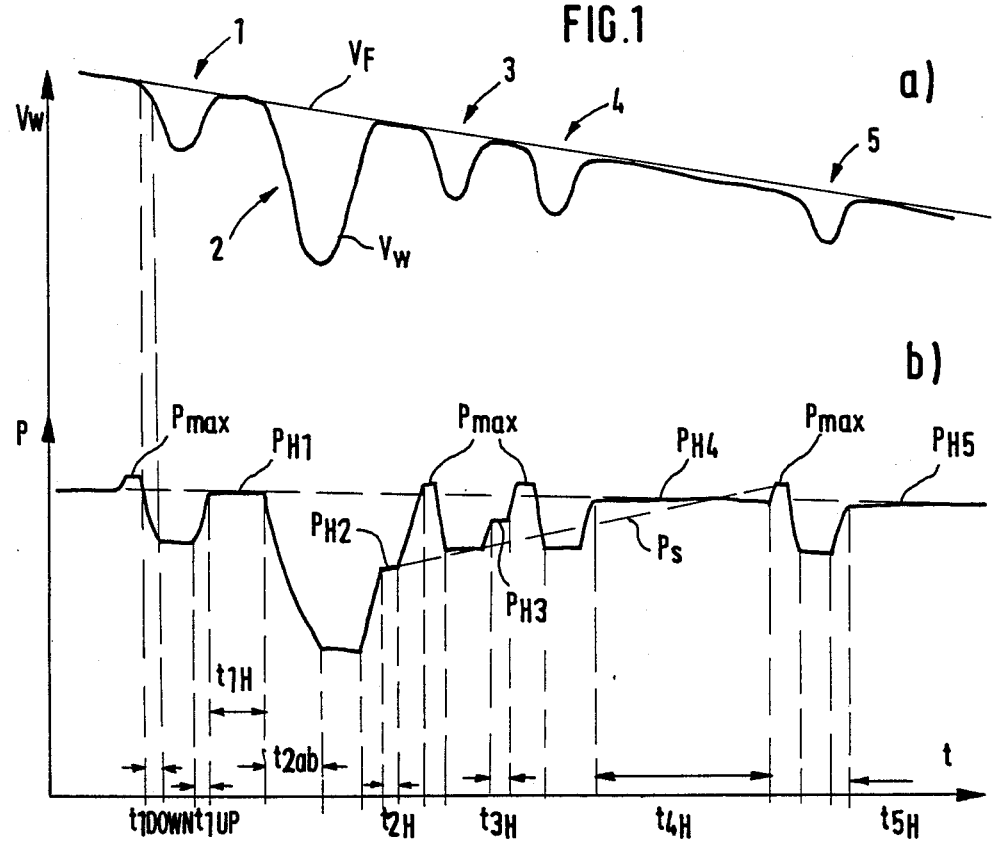

United States Patent [19]

Braschel

[11] Patent Number: 4,900,099

[45] Date of Patent: Feb. 13, 1990

[54] METHOD OF CONTROLLING THE BRAKE PRESSURE IN AN ANTI-LOCK VEHICLE BRAKE SYSTEM

[75] Inventor: Volker Braschel, Neuwied, Fed. Rep. of Germany

[73] Assignee: Lucas Industries public limited company, Birmingham, England

[21] Appl. No.: 327,836

[22] Filed: Mar. 23, 1989

[30] Foreign Application Priority Data

Mar. 24, 1988 [DE] Fed. Rep. of Germany ....... 3810020

[51] Int. Cl.$^4$ ................................................. B60T 8/64
[52] U.S. Cl. ................................. 303/95; 303/DIG. 4
[58] Field of Search ....................... 303/95, 96, 97, 98, 303/99, 100, 104, 110, 111, DIG. 3, DIG. 4; 364/426.02, 426.03

[56] References Cited

U.S. PATENT DOCUMENTS

| | | | |
|---|---|---|---|
| 4,673,225 | 6/1987 | Kade | 303/100 |
| 4,761,741 | 8/1988 | Agarwal et al. | 364/426.02 |
| 4,800,498 | 1/1989 | Matsui et al. | 364/426.02 |
| 4,842,343 | 6/1989 | Akiyoshi et al. | 303/95 X |

FOREIGN PATENT DOCUMENTS

| | | |
|---|---|---|
| 0125614 | 11/1984 | European Pat. Off. . |
| 2460904 | 1/1976 | Fed. Rep. of Germany . |
| 2136440 | 4/1981 | Fed. Rep. of Germany . |
| 3610185 | 10/1987 | Fed. Rep. of Germany . |

Primary Examiner—Duane A. Reger
Attorney, Agent, or Firm—Scrivener and Clarke

[57] ABSTRACT

In a method of controlling the brake pressure in an anti-lock vehicle brake system (ABS system), wherein the rotational behavior of a braked wheel is measured and the brake pressure is lowered in response to the slip and/or rotational retardation of the wheel if threshold values are exceeded, and is subsequently raised again and then kept constant during a phase of steady pressure, it is provided that the duration (t1H, t2H ... t5H) of the pressure stability phase is adjusted in response to a comparison of the pressure reduction periods (t1DOWN, t2DOWN ... ) and/or the pressure build-up periods (t1UP, t2UP ... ) of the instantaneous control cycle (1,2 ... 5) with those of at least one preceding control cycle in order to obtain shorter stopping distances.

3 Claims, 2 Drawing Sheets

METHOD OF CONTROLLING THE BRAKE PRESSURE IN AN ANTI-LOCK VEHICLE BRAKE SYSTEM

The invention relates to a method of controlling the brake pressure in an anti-lock vehicle brake system (ABS system), wherein the rotational behavior of a braked wheel is measured and the brake pressure is lowered in response to the slip and/or rotational retardation of the wheel if a given threshold value is exceeded, and is subsequently raised again and then kept constant during a phase of steady pressure.

Such a method is known from DE-OS No. 36 10 185.

Optimum control of the brake pressure in the known case, i.e. adjustment of the brake pressure throughout all the control cycles of ABS brake application to such values as will guarantee that the wheel runs in the optimum range of the coefficient-of-friction/slip curve for the greatest possible fraction of the overall braking time, is aimed at by subdividing the brake pressure build-up into two phases. In a first phase of pressure increase the brake pressure is raised at a relatively steep gradient, in other words very quickly, while the increase is effected at a lesser gradient, i.e. more slowly in a subsequent phase. The periods of time provided for both pressure build-up phases are adjusted in response to the time period of pressure reduction in the preceding control cycle.

EP-A No. 2 0 125 614 likewise discloses a brake pressure control method with which the brake pressure is kept steady for a certain interval following an increase in pressure. In that case, however, only the pressure build-up period is adjusted in response to parameters which were measured previously. The phase of steady pressure, on the other hand, in other words the period during which the brake pressure is maintained constant, is not varied in response to any control magnitudes measured previously.

It was recognized, with the prior art discussed above, that, following a lowering, the brake pressure should be raised as rapidly as possible to a level at which the resulting slip will be such as to provide a good retardation effect in order to achieve a short stopping distance. With the method according to DE-OS No. 36 10 185, however, the brake pressure prevailing at the end of the first pressure build-up phase carried out at a steep gradient still is to be so far away from the locking pressure that this locking pressure is attained during a subsequent pulsed raising of the pressure, after a rather long time only, typically in the range of from 300 to 400 ms. The calculation of the pressure build-up period in response to the pressure reduction period of the preceding control cycle, provided with this state of the art, has the disadvantage that the periods of pressure reduction are dependent on the pressure in the wheel brake cylinder. For this reason the control intervals in the various control cycles during a braking operation may vary greatly so that it may become difficult to determine the right duration for a quick rise in pressure. If the period of quick pressure increase is too short, however, the retarded wheel will run too long at lesser than the optimum slip so that stopping distance is given away.

With the known methods, therefore, it is not yet possible to raise the brake pressure so quickly immediately up to just below the locking pressure that the shortest physically possible stopping distance is realized. Moreover, with the known methods including a two-step pressure increase at different gradients, the pressure cannot be caused to approach the locking pressure at once since that would involve too high a regulating frequency. It is explained in DE-PS No. 27 06 278 that the period duration of the control cycles cannot be given any small value whatever because there is a limit control frequency for each vehicle which must not be exceeded and which, in general, is determined by the resonance frequency of the axles of the vehicle.

It is, therefore, an object of the instant invention to develop the method of the generic type defined above for control of the brake pressure in an anti-lock vehicle brake system such that further shortening of the stopping distance is obtained.

This object is met, in accordance with the invention, with a method as specified, in that the duration of the pressure stability phase is adjusted in response to a comparison of the pressure reduction periods and/or pressure build-up periods of the instantaneous control cycle with those of at least one previous control cycle.

According to the invention, the brake pressure thus is raised at a single, rather steep gradient to just below the locking pressure and then is maintained constant during a so-called pressure stability phase. The duration of that phase of steady pressure is calculated in advance in response to magnitudes measured previously, namely in correspondence with a comparison between the periods of pressure reduction and/or pressure build-up. It is preferred to compare the preceding pressure reduction periods with each other for determining the duration of the phase of steady pressure. If the pressure reduction period in the control cycle under way does not differ substantially from that of the preceding control cycle, the pressure stability phase may be set to be rather long, at values of for instance 300 to 800 ms, preferably from 300 to 400 ms.

If the pressure reduction periods measured in the various control cycles are in good agreement, the pressure build-up period required can be calculated very accurately in advance.

Thus the invention permits very rapid raising of the brake pressure to just below the locking pressure so that the wheel quickly attains a range of slip in which the maximum braking effect is obtained. Any longer phases of underbraking (i.e. phases during which the brake pressure at the wheel is less than would be possible) are avoided in accordance with the invention in that a relatively short phase of steady pressure is provided when roadway surface conditions are irregular, a circumstance reflected by varying pressure reduction or pressure build-up periods, and that this is followed by further raising of the pressure to see if the wheel gets into an unstable range.

This means that according to the invention the duration of the pressure stability phase is calculated anew for each control cycle, beginning with the first cycle of brake application. To this end, the pressure reduction period of the instantaneous control cycle (which period results in per se known manner by certain threshold values of slip and/or rotational retardation of the wheel being exceeded) is compared at least with the pressure reduction period in the preceding control cycle or with a plurality of pressure reduction periods in a plurality of previous control cycles. The phase of steady pressure is extended up to a predetermined maximum value in response to the degree of conformity. In response to the extent of disagreement between the pressure reduction periods, on the other hand, the pressure stability phase is rendered shorter, down to a minimum value of a few milliseconds.

At the end of a pressure stability phase the pressure is raised briefly to a maximum value in order to determine whether perhaps the coefficient of friction of the roadway has improved or to pass the threshold which indicates the tendency of slipping of the wheel and then to lower the brake pressure again and maintain the steering capability of the wheel.

Figure 2:
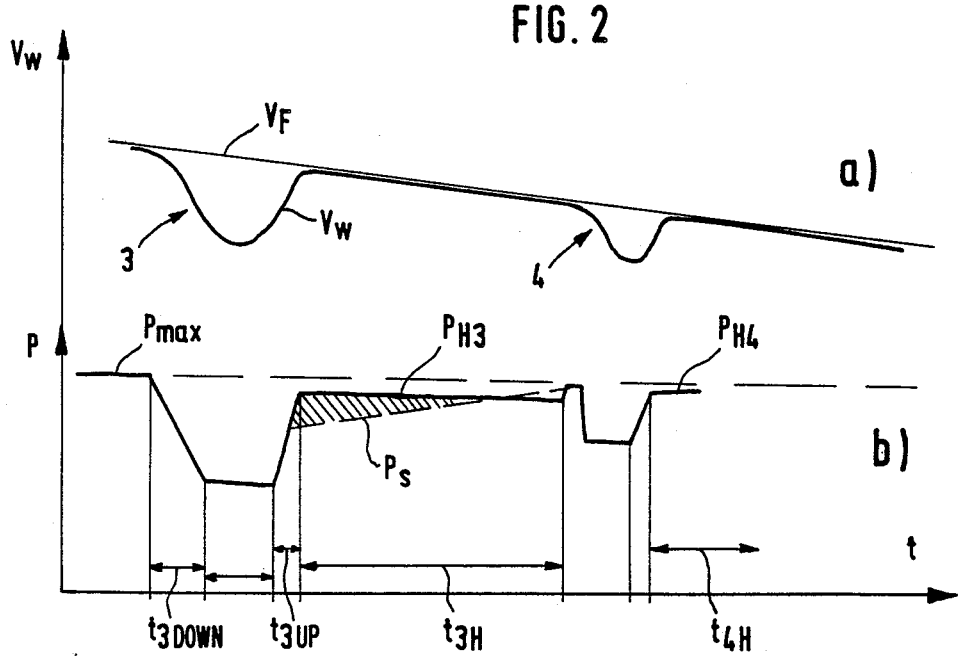

The invention will be described further, by way of example, with reference to the accompanying drawings, in which:

FIG. 1 is a graph showing, above a common time scale, the course of a reference speed and of the wheel circumference speed as well as the corresponding course of the brake pressure across five control cycles, and FIG. 2 is a presentation similar to FIG. 1 across two control cycles, on an enlarged scale.

A typical course of a reference speed VF (also called vehicle velocity) and the course of the circumferential speed of the wheel to which the brake is applied with anti-lock control are plotted in the usual manner above the time coordinate in FIG. 1 (a). The drawing shows five control cycles 1,2,3,4,5 of an application of the brakes.

The slip of the wheel, in other words the difference between the wheel circumference speed VW and the reference speed VF is drawn upon in per se known manner for controlling the brake pressure P. It is also known to those skilled in the art that the brake pressure P is adjustable in addition or alternatively in response to the (positive or negative) rotational retardation of the wheel at which the brake is applied. As these relationships are known, they need not be explained in detail here.

Those skilled in the art nowadays also are familiar with the means required to measure the magnitudes on which the control relies and those to regulate the brake pressure.

The invention is concerned with the adjustment of the duration of the so-called pressure stability phases, indicated in FIG. 1(b) as PH1, PH2, PH3, PH4, and PH5. The corresponding time periods are marked t1H, t2H, t3H, t4H, and t5H in FIG. 1(b).

In the first control cycle 1 a pressure reduction period t1DOWN is measured and stored in a processor. The duration of the pressure reduction period t1DOWN results in conventional manner from predetermined threshold values being exceeded. Subsequently, the brake pressure is raised once more during period t1UP as further predetermined threshold values are being exceeded in respect of slip and/or wheel acceleration. The duration of period t1UP either results from threshold values being exceeded or is calculated in advance in per se known manner. The pressure build-up period t1UP is followed by the brake pressure P being held at value PH1 during the period t1H. As a comparison of the pressure reduction period t1DOWN with previous cycles cannot yet be made during the first control cycle 1, the period t1H of the phase of steady pressure is adjusted to a small value to begin with, for example to 50 ms.

It is assumed that the brakes are applied on an uneven road surface and that the coefficient of friction becomes worse briefly at the end of the pressure stability phase t1H of the first control cycle, as may happen, for example, when the wheel moves over a patch of ice. The subsequent pressure reduction period t2DOWN will become correspondingly long. This means that the pressure reduction period t2DOWN of the second control cycle differs distinctly from the pressure reduction period t1DOWN of the first control cycle.

Following the subsequent pressure build-up period of the second control cycle, therefore, the pressure stability phase t2H of the second control cycle during which the brake pressure is kept constant at value PH2 is adjusted to be much shorter than the duration t1H of the phase of steady pressure during the first control cycle 1. Now let us assume that the wheel has left the patch of ice and again moves on a road surface which has a better coefficient of friction. This means that during pressure stability phase t2H no threshold is passed which indicates a risk of the wheel becoming locked; the pressure is raised to the maximum value $P_{max}$ at a rather steep gradient. Because of this increased brake pressure, once more a threshold value indicating the risk of locking will be passed, and a third control cycle 3 (cf. FIG. 1(a)) is initiated. The pressure reduction period results in the same way as with control cycles 1 and 2 described above, and the pressure build-up phase too. As assumed above, in control cycle 3 the wheel no longer moves across the patch of ice which was decisive for control cycle 2 so that therefore the pressure reduction period in the third control cycle 3 is much shorter than in the second control cycle 2, as may be taken directly from FIG. 1(b). Accordingly, the duration t3H of the pressure stability phase in the third control cycle 3 during which the brake pressure is held steady at value PH3 is relatively short. Following this short duration t3H of the steady pressure phase in the third control cycle, the pressure again is raised at a steep gradient to the maximum value $P_{max}$ and the wheel once more turns in a range subject to the risk of locking so that a fourth control cycle 4 is initiated. As the road surface conditions did not change, the pressure reduction period in the fourth control cycle corresponds to that of the third control cycle. The duration t4H of the pressure stability phase in the fourth control cycle is adjusted to be rather long, for example from 300 to 400 ms, because of the agreement of the durations of the pressure reduction periods in the third and fourth control cycles.

The wheel at which the brake is applied, therefore, is brought in a single pressure stage to just below the range of instability where it is kept for a rather long time. This is possible as the necessary pressure build-up period of at least one previous control cycle is known. The pressure build-up period thus obtained empirically is drawn upon for the instantaneous control cycle. The value derived from preceding control cycles for the pressure build-up period may be reduced by a very small margin (a few milliseconds, such as 3 ms) so as to remain slightly below the control threshold presumably to be expected. Following the rather long duration t4H of the phase of steady pressure in the fourth control cycle, the brake pressure is raised briefly to the maximum value $P_{max}$ in order to find out if there is a positive leap in the coefficient of friction of the road surface (in other words an improvement of the coefficient of friction) or if, in the absence of such a "positive" leap, again a slip and/or rotational retardation threshold is passed so that a fifth control cycle is initiated, as shown in FIG. 1. In FIG. 1, it is assumed that the coefficient of friction remained unchanged as compared to the third and fourth control cycles so that, therefore, the pressure reduction period in the fifth control cycle is just as long as the pressure reduction periods in the third and fourth control cycles. Consequently, also in the fifth control cycle the duration t5H of the pressure stability phase during which the brake pressure is held steady at the value PH5 is adjusted to be rather long, just like during the fourth control cycle.

FIG. 1(b) in addition shows a course of brake pressure, indicated by the discontinuous line PS. This illustrates the two-stage pressure build-up at different gradients according to the prior art (DE-OS No. 36 10 185). Comparing the courses of brake pressure PS, on the one hand, and the one described with reference to the curve illustrating the invention, on the other hand, it is evident that the wheel subjected to brake actuation runs closer to the critical range of slip and, therefore, better braking effect is achieved by the invention.

FIG. 2 demonstrates that even more plainly by an enlarged representation. It shows two control cycles designated 3 and 4, in other words two control cycles taken out of a brake application which is under way. It is assumed that the time period t3DOWN of pressure reduction during the third control cycle 3 corresponds to that of the pressure reduction in the preceding control cycle. In accordance with the above explanation, the duration t3H of the pressure stability phase in the third control cycle during which the pressure is held steady at the value PH3 is set to be rather long. Also the pressure build-up period t3UP is rather long so that the pressure PH3 lies only a little below the locking pressure. The known two-stage pressure build-up at different gradients in illustrated by curve PS. The gain in brake force as against the known method is demonstrated in FIG.2(b) by the hatched area.

What is claimed is:

1. A method of controlling the brake pressure in an anti-lock vehicle brake system, wherein the rotational behavior of a braked wheel is measured and the brake pressure is lowered in response to the slip and/or rotational retardation of the wheel if a given threshold value is exceeded, and is subsequently raised again and then kept constant during a phase of steady pressure, characterized in that the duration (t1H, t2H . . . t5H) t5 H) of the pressure stability phase is adjusted in response to a comparison of the pressure reduction period (t1DOWN, t2DOWN . . . ) and/or the pressure build-up period (t1UP, t2UP . . . ) of the present control cycle with a pressure reduction period or a pressure build-up period in a previous control cycle such that the duration of the phase of steady pressure becomes longer if the periods of pressure reduction or pressure build-up compared are in agreement than if they differ.

2. The method as claimed in claim 1, characterized in that the pressure is raised briefly at the end of a pressure stability phase.

3. The method as claimed in claim 1 or 2, characterized in that the pressure build-up continues until another predetermined threshold value is reached.

* * * * *